Patented Apr. 27, 1943

2,317,891

UNITED STATES PATENT OFFICE 2,317,891

WATERPROOF ADHESIVE COMPOSITION

Brook J. Dennison, Aspinwall, Pa., assignor to Pittsburgh Plate Glass Company, Allegheny County, Pa., a corporation of Pennsylvania No Drawing. Application June 9, 1939, Serial No. 278,214

6 Claims. (Cl. 260—32)

The present invention relates to a new waterproof adhesive composition and primarily to a resin-silicate mixture suitable as a bonding agent for laminating materials.

One object of the invention is the provision of an adhesive composition which may be used to unite various materials with the formation of a bond impervious to moisture.

Other objects and advantages of the invention will become more apparent from the following detailed description of certain preferred embodiments thereof.

It is well recognized that many forms of adhesives have been developed and are in commercial use. It is equally true that certain of these adhesives are applicable only to special uses. For example, a water soluble cement may be used to unite materials where there is no possibility of subsequent exposure to moisture. Unfortunately, in spite of warnings laminated articles bonded together with a water soluble cement are very often exposed to moisture-laden air and the several laminations consequently separate. A greater source of possible trouble arises where two or more laminae of different materials are attempted to be bonded together.

It has been proposed to unite wood veneer and glass to obtain special decorative effects and a suitable adhesive for this purpose must be effective not only with the porous wood veneer, but also with the non-porous glass. Certain processes have been developed which have been utilized in the industry, but it is readily apparent that considerable improvement is still possible therein. The slight thickness of the wood veneer and considerable variation in that thickness results in an imperfectly bonded product. An increase in the thickness of adhesive layer or the application of a reinforcing layer to the article before laminating would insure a uniform surface adhesion, but the bonded article still fails on exposure to moisture.

Tests conducted in the laboratory show that the bond did not separate between the plastic and the wood veneer, which would normally be expected, due to the porosity of the wood film, but rather that the separation was between the plastic and the glass. This result may be explained by the fact that adhesion of plastic to glass is largely specific, whereas the adhesion of plastic to wood is mechanical, and the specific adhesion is more readily destroyed when exposed to moisture. Application of varnish, shellac, or paint to the exposed surface of the wood veneer retarded moisture penetration to some degree, but the exposed edges of the bond were still subject to moisture penetration resulting in separation of the laminated sheet.

Briefly stated, the present invention contemplates the development of adhesives in which a bond unaffected by moisture is obtained.

The vinyl acetal resins have recently come into prominence in the preparation of laminated glass because of their direct adhesion to glass and their resistance to moisture penetration. At the same time, however, these vinyl acetal resins are not equally as effective in bonding wood to glass. It has been found, however, that the addition of relatively small amounts of partially hydrolyzed organic silicates to a vinyl acetal resin increases the adhesiveness thereof and also the moisture resistance of the vinyl resin.

I am aware that organic silicates have been used in combination with cellulosic plastics, but the resultant mixture can in no way be considered as comparable to a composition containing partially hydrolyzed organic silicates and vinyl resins. It seems quite probable that hydrolysis of the organic silicates yields a condensation product rather than silicic acid and alcohol. As contemplated by my invention 50 parts of organic silicate, 50 parts of denatured alcohol, 10 parts of water and a trace of hydrochloric acid are refluxed for approximately one hour to bring the organic silicate to the proper degree of hydrolysis. This treatment is presumed to result in the formation of a compound of the type—

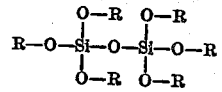

where R represents the organic radicle of the silicate.

An increase in the ratio of water to ester will result in a compound of the type—

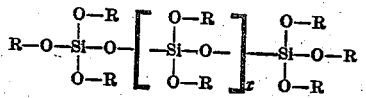

in which $x$ is a function of the ratio.

The partially hydrolyzed organic silicate is admixed with an equal amount of vinyl acetal resin and the two materials are dissolved in an organic solvent to provide an adhesive composition, which is in a form most readily used. It has been ascertained that any of the vinyl acetal resins, such as vinyl formate, vinyl acetate and vinyl butyrate may be employed in compounding the adhesive, and if it is so desired small amounts of plasticizing agents may be incorporated with the resin. The fact that the presence of plasticizing agents does not impair the value of the adhesive compound affords an outlet for vinyl scrap accumulating from the production of safety glass.

A more specific example of an adhesive composition as contemplated by my invention is:

| | Per cent |
|---|---|
| Vinyl resin | 10 |
| Partially hydrolyzed ethyl silicate | 10 |
| Methanol | 70 |
| Denatured ethanol | 10 |

In the foregoing example percentages are of course expressed in accordance with conventional nomenclature in terms of the weights of the constituents.

Methyl, propionyl or butyl silicates may be substituted in the composition and other alcohols, or similar organic solvents may be utilized in preparing the adhesive solution.

An adhesive coating of the above-described composition was applied to sections of wood veneer and plates of glass which were united and laminated at approximately 200° F. under 90 pounds pressure per square inch. These composite plates were subjected to test in a closed chamber heated to 120° F. and containing 100 per cent relative humidity. At the end of 24 hours no separation had occurred. At the end of 72 hours the composite plates remained unchanged. Under equivalent conditions test plates bonded together with ordinary adhesives were subject to extreme separation.

It was observed that the wood veneer lamina of the composite unit absorbed considerable water and in order to prevent this moisture penetration the wood veneer should be coated with a regular water resistant spar varnish.

The disclosed adhesive composition may be used to form a moisture impervious coating over normally porous materials. In this connection a solution of vinyl resin and organic silica is brushed over the material to be protected and the solvent is then evaporated. The protective coating will bond very tightly the absorbent material. It has also been found that the coated material may be sprayed with water before it is heated to drive off the solvent contained in the covering layer and again a very secure bond is effected.

The disclosed adhesive composition is also susceptible of many other uses. For example, it may be employed to bond glass to metal or wood to metal. It may serve as a cement in joining glass to glass or wood to wood, and in fact as a cement generally.

It will at once be apparent that various modifications in the composition of the adhesive solution and the ingredients admixed therewith are possible without departing from the spirit of the invention or the scope of the appended claims.

What I claim is:

1. A waterproof adhesive composition comprising a mixture of vinyl acetal resin and a partially hydrolyzed alkyl ester of silicic acid obtained by hydrolyzation of an ortho-alkyl silicate in the ratio of 50 parts of ortho-alkyl silicate and 10 parts of water, the parts being by weight.

2. A water-resistant adhesive composition comprising a mixture of vinyl acetal resin and a partially hydrolyzed ethyl silicate obtained by hydrolyzing approximately 50 parts of orthoethyl silicate and 10 parts of water, the parts being by weight.

3. A water-resistant adhesive composition comprising a mixture of vinyl acetal resin and partially hydrolyzed ethyl silicate dissolved in an organic solvent, the said hydrolyzation being effected by the inner action of approximately 50 parts of ethyl silicate and 10 parts of water, said parts being by weight.

4. A water-resistant adhesive composition comprising a mixture of vinyl butyral resin and partially hydrolyzed ethyl silicate dissolved in water, the partially hydrolyzed ethyl silicate being obtained by hydrolyzing approximately 50 parts of silicate and 10 parts of water, the parts being by weight.

5. A water-resistant adhesive composition comprising a solution of vinyl butyral resin, a plasticizer for the resin and partially hydrolyzed ethyl silicate in a mixture of methanol and ethanol, the hydrolyzed ethyl silicate being obtained by hydrolyzing approximately 50 parts of ethyl silicate with 10 parts of water, the parts being by weight.

6. A waterproof adhesive composition comprising approximately 10 percent of plasticized vinyl butyral resin, 10 percent of partially hydrolyzed ethyl silicate, 70 percent of methanol and 10 percent of ethanol, the partially hydrolyzed ethyl silicate being obtained by hydrolyzing approximately 50 parts of ethyl silicate with 10 parts of water, the parts being by weight.

BROOK J. DENNISON.